May 10, 1966 D. G. FLADLIEN ETAL 3,250,197
PRECISION FOCUSING ADJUSTMENT FOR PHOTOGRAPHIC
RECORDING APPARATUS
Filed Aug. 14, 1963 2 Sheets-Sheet 1

David G. Fladlien,
J Perry Smith,
INVENTORS.

BY.

AGENT.

David G. Fladlien,
J Perry Smith,
INVENTORS.

3,250,197
PRECISION FOCUSING ADJUSTMENT FOR
PHOTOGRAPHIC RECORDING APPARATUS
David G. Fladlien, Los Angeles, and J Perry Smith, Hawthorne, Calif., assignors, by mesne assignments, to TRW Inc., a corporation of Ohio
Filed Aug. 14, 1963, Ser. No. 302,106
5 Claims. (Cl. 95—45)

This invention relates to a precision focusing adjustment for photographic recording apparatus and more particularly to means for providing a very fine and precise adjustment of the focal plane of a camera back assembly, adapted to be mounted on an image converter tube, an oscilloscope or similar device for displaying an image of high speed luminous transient events, and which makes provision for accurate focusing of the image on all portions of the focal plane, so that the focal plane is in exact parallelism with the image plane.

Many different arrangements have been provided for adjusting the focal plane of a camera back axially with respect to the image on a cathode ray tube or a similar device, but unless the camera back is very accurately aligned, so that the focal plane of the camera is in exact parallelism with the image produced on the oscilloscope or image converter, then certain peripheral portions of the focal plane may be slightly out of focus, thus producing a somewhat blurred image in these areas, even if the central portion of the focal lane is in exact focus.

The present invention provides novel means for adjusting the focal plane of a camera back axially with respect to the image plane of an electronic image converter tube, and also provides means for tilting the focal plane with respect to the axis in any direction, so that the focal plane of the camera may be aligned in exact parallelism with the image plane of the electronic converter tube.

Briefly stated, one preferred embodiment of the precision focusing adjustment for photographic recording apparatus of the present invention consists essentially of a dividing back housing which is provided with a dovetail groove or slide adapted to receve an adapter for a cut film holder, a Polaroid camera or any other type of photographic recording device. The adapter is slidably mounted in the dividing back housing and is locked in position by a cam lock. The dividing back housing also mounts a lens and iris assembly which is slidably mounted in a focusing adjustment housing.

A focusing screw is rotatably mounted in the focusing adjustment housing and is actuated by a focusing knob to threadably engage a focusing nut in which a plurality of guide pins are threaded at one end. The other ends of the guide pins are rotatably mounted in the dividing back housing and are simultaneously moved in an axial direction by the focusing screw and nut to move the focal plane of the camera back in an axial direction with respect to the image plane of the image converter tube, when the focusing knob is rotated. However, each of the guide pins may be individually rotated to vary the inclination of the focal plane of the camera back with respect to the axis of the lens assembly in order to make the focal plane exactly parallel with the image plane of the converter tube and provide an accurate focusing of the image on all portions of the focal plane of the camera back, which will result in a sharp clear image on all portions of the film.

One object of the present invention is to provide a precision focusing adjustment for a photographic recording apparatus which facilitates axial adjustment of the focal plane of the camera back axially with respect to the image plane and also provides for tilting of the focal plane with respect to the axis for obtaining a sharp focus on all areas of the film in the focal plane.

Other objects and many of the attendant advantages of this invention will be readily appreciated as the same becomes better understood by reference to the following detailed description when considered in connection with the accompanying drawings wherein.

Figure 1:
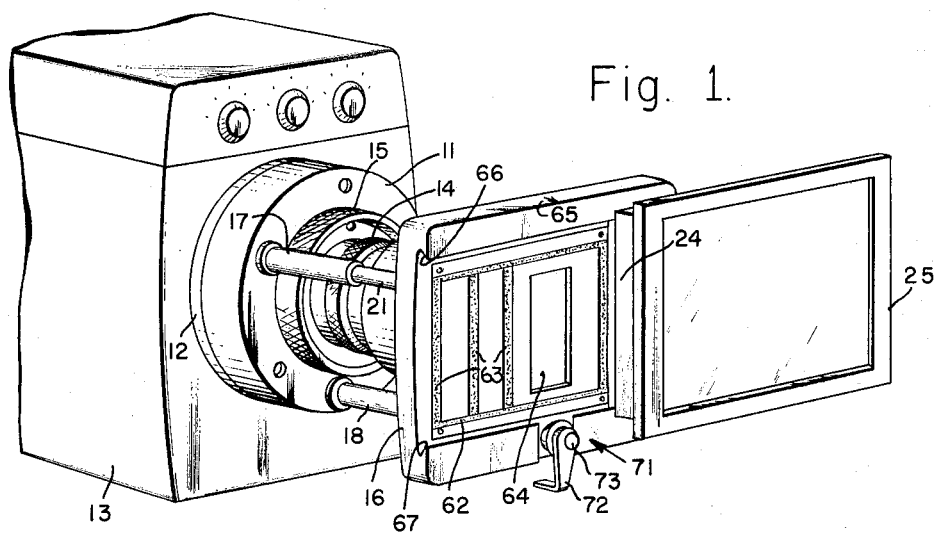
FIG. 1 is a pictorial view illustrating one preferred embodiment of the precision focusing adjustment for photographic recording apparatus of the present invention attached to an image converter tube assembly.

Referring now to the drawings in detail and more particularly to FIG. 1, the focusing adjustment housing 11 is shown attached by an adapter plate 12 to an electronic image converter tube assembly 13, such as the one shown in the copending application Serial No. 283,423, filed May 27, 1963, entitled "Anode Capacitor."

However, the present invention may also be utilized as an attachment to an oscilloscope, or other means for displaying an image of a high speed luminous event.

A relay lens assembly 14 is slidably mounted in the focusing knob 15 which is rotatably mounted in the focusing adjustment housing 11. The other end of the relay lens assembly 14 is rigidly mounted in the dividing back housing 16 which mounts a camera back and is supported by three guide pin bushings 17, 18 and 19 and the guide pins 21, 22 and 23 which are movably mounted therein and are rotatably mounted at their outer ends in the dividing back housing 16.

The camera back preferably consists of an adapter frame 24 slidably mounted in the dividing back housing 16 and is adapted to mount a cut film holder 25. Another interchangeable camera back adapter may be utilized for mounting a Polaroid camera or other types of photographic recording apparatus.

Figure 3:
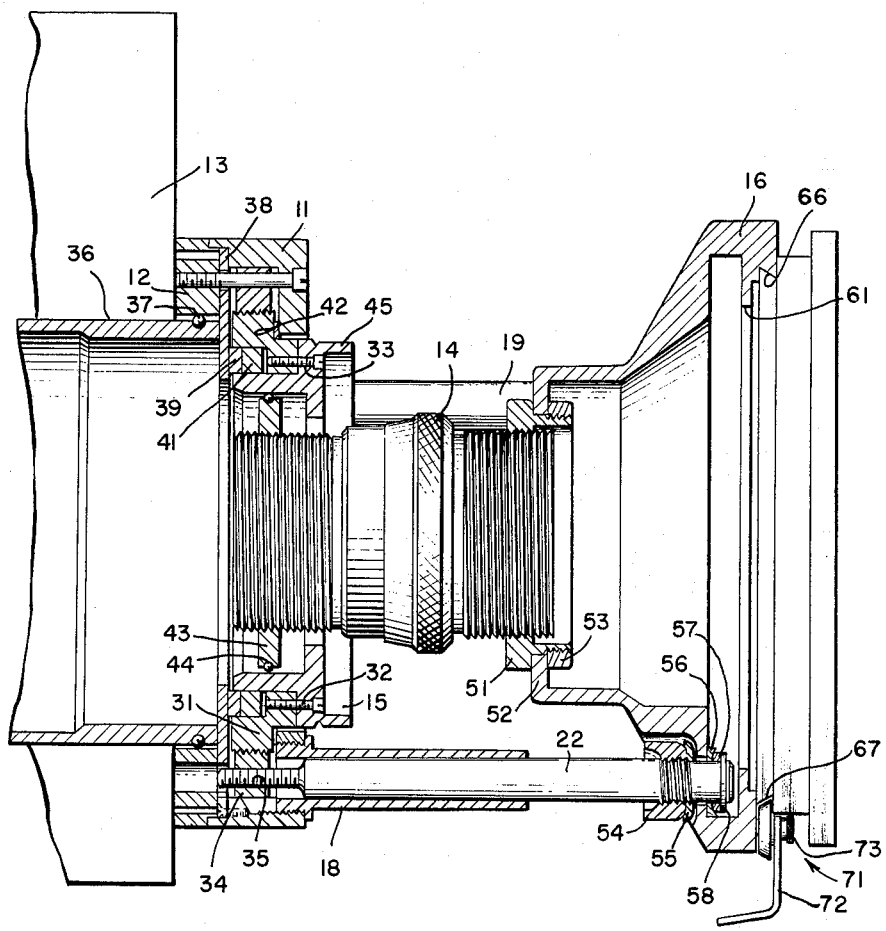
FIG. 3 is a longitudinal sectional view taken on the line 3—3 of FIG. 2.

The details of construction are more clearly shown in the longitudinal sectional view of FIG. 3. The focusing adjustment mechanism mounted within the housing 11 consists of a focusing screw 31 which is rigidly secured to the focusing knob 15 by means of screws such as the ones shown at 32 and 33, so that the focusing screw 31 rotates when the focusing knob 15 is manually rotated. The focusing screw 31 has threads engaging the corresponding threads on the focusing nut 34, which is prevented from rotating, since the threaded ends of the guide pins 17, 18 and 19 are threaded into the focusing nut as indicated at 35 in FIG. 3.

The end of the image converter tube 36 is shown in FIG. 3 as being mounted in the adapter plate 12 with an "O" ring 37 therebetween. A thrust cover plate 38 engages the end of the tube 36 and extends between the adapter plate 12 and the focusing adjustment housing 11.

A thrust bushing 39 and a thrust plate 41 are positioned between the thrust cover plate 38 and a focusing screw 31. Another thrust bushing 42 is positioned between the focusing screw 31 and the housing 11.

The inner end of the lens assembly 14 is provided with a positioning ring 43 having an angular groove receiving an "O" ring 44 which engages the inner surface of a lens guide and light seal 45, which is formed as an annular flange on the inner side of the focusing knob 15.

The lens assembly 14 includes a lens system (not shown) for focusing the image on the focal plane of the film in the cut film holder 25 or the film in any other type of camera which may be utilized on the adapter 24. The lens assembly 14 may also include an iris (not shown) for controlling the aperture or may have a fixed aperture depending on the particular application.

The other end of the lens assembly 14 is also threaded into a mounting ring 51 which is secured to an annular flange 52 on the dividing back housing 16 by a mounting nut 53.

The outer ends of the guide pins 21, 22 and 23 are each secured to the dividing back housing 16 by an assembly such as the one shown in FIG. 3 at the outer end of guide pin 22, the assembly forming a ball and socket joint with a limited degree or freedom of movement. This assembly consists of a spherical nut 54 having a convex spherical surface which engages the concave spherical surface on the alignment washer 55 which engages the inner surface of the dividing back housing 16.

The guide pin 22 extends through an opening in the dividing back housing 16 and on the outer end of the guide pin 22 is positioned another alignment washer 56 with a concave spherical face engaging the convex spherical face of the washer 57. The whole assembly is held in position by snap ring 58 which engages in an annular groove on the outer end of the guide pin 22.

The spherical nut 54 may obviously be tightened to clamp the assembly tightly in position against the dividing back housing 16, but the nut 54 may also be loosened slightly to permit the guide pin 22 to be rotated for a fine precision focusing adjustment in a manner to be described subsequently.

Figure 2:
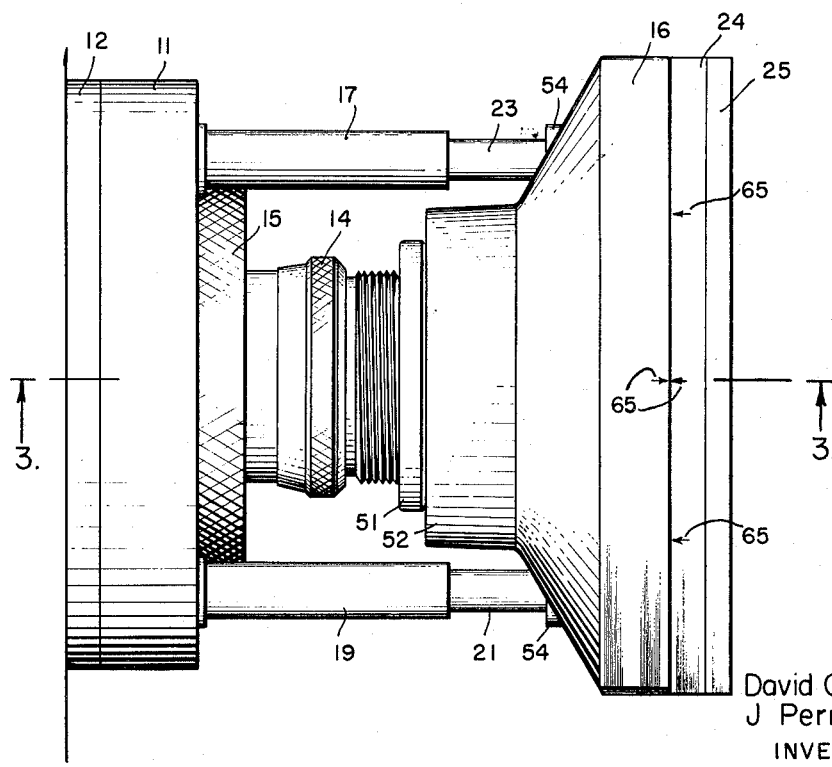
FIG. 2 is a top plan view of the precision focusing adjustment of FIG. 1.

The dividing back housing 16 is provided with a recess 61 which receives the dividing back light block or masking plate 62 which is provided with felt strips 63 to prevent light leakage around the opening 64 through which the image is projected on the film in the camera back, such as the cut film holder 25. As indicated in FIG. 1 at 65 the dividing back housing may be provided with an index mark 65 to facilitate positioning of the cut film holder for multiple exposures by alignment with two or more index marks on the adapter 24 as shown in FIG. 2.

The dividing back housing 16 is also provided with upper and lower dove-tail grooves 66 and 67 which slidably receive the camera back adapter 24.

A cam lock or latch handle assembly 71 is adapted to clamp the adapter 24 in position on the dividing back housing 16, when the cut film holder 25 is properly aligned with the light opening 64, as indicated by the index marks 65. The cam lock 71 consists of a latch handle 72 which is secured to an eccentric bushing 73 on which the locking roller 74 is mounted for engaging the lower edge of the adapter 24.

OPERATION

The resolution of a photographic system particularly a system working at close conjugates, is given by the expression:

$$\frac{1}{R_s 1.8} = \frac{1}{R_o 1.8} + \frac{1}{R_l 1.8} + \frac{1}{R_f 1.8}$$

where:

$R_s$ = resolution of the system
$R_o$ = resolution of the object
$R_l$ = resolving power of the lens
$R_f$ = resolving power of the film Normally, the object being photographed is so well defined that the $R_o$ term does not materially affect the equation. In the case of recording information from cathode ray tubes, scintillation screens and image converter tubes, however, the object being photographed has a finite number of line pairs. In most applications, this number is from 10 to 30 line pairs per millimeter. Values of this magnitude cause the object and the film to be the limiting factors in obtaining resolution in such a system. Thus, the total resolving power of a typical recording system working at close conjugates can be thought of as a function of the resolution of the object being photographed. Photographic recording systems for use with cathode ray tubes, scintillation screens and image converter tubes are generally characterized by a low level of illumination. This characteristic requires the use of a high aperture lens (low $f$ number). The depth of field of this type of lens is a function of the aperture, and thus to record a maximum amount of information from the objective, it is necessary that the photographic recording system be critically focused at a point on the film plane. The present invention provides the capability of obtaining a critical focus. Parallelism of the film plane and the objective plane is obtained by adjusting one or more of the three guide pins 21, 22 and 23 until the film plane and the objective plane are parallel.

In the photographic recording apparatus of the present invention, the dividing back housing 16 can be very accurately machined, so that the inner face of the dove-tail grooves 66 and 67 are exactly parallel to the image plane of the lens assembly 14, which is rigidly mounted therein by the mounting ring 51 and mounting nut 53 on the annular flange 52. The locking roller 74 engages the bottom of the adaptor frame 24 and forces it into close contact with the inner surfaces of the dove-tail grooves 66 and 67, and, since the cut film holder or other type of camera back can also be accurately machined to position the film plane parallel to the inner faces of the dove-tail grooves 66 and 67, a very accurate alignment of the camera back with respect to the lens assembly 14 can be readily made.

However, it is very difficult, if not impossible, to mount the photographic recording apparatus by means of the adaptor plate 12 accurately with respect to the image converter tube assembly 13 or other image displaying apparatus.

Since the lens assembly 14 is corrected for the curvature of the cathode ray tube or image converter tube, it should be accurately aligned therewith. Therefore, the inner end of the lens assembly 14 is floating on the annular flange 43 and O-ring 44 in the lens guide 45 on the focusing knob 15, and may be tilted by means of guide pins 21 and 22 and 23 to provide the accurate alignment necessary.

In the operation of the precision focusing adjustment of the present invention the adaptor 24 with the cut film holder 25, or a Polaroid or other type of camera back (not shown), mounted thereon is positioned in the dividing back housing 16 with the index marks 65 registered to position a portion of the film behind the light opening 64. The cam lock 71 is rotated by the latch handle 72 to engage the locking rotor 74 with the lower edge of the adaptor 24 to lock the adaptor and film holder 25 in position.

The focusing knob 15 is rotated to move the dividing back in a direction substantially parallel to the optical axis of the lens assembly, until a sharp image is produced on a portion of the ground glass or other viewing and focusing means on the cut film holder or other type of camera. Since the image will be in sharp focus only on some portion of the viewing screen the spherical nuts 54 are loosened slightly on each of the guide pins 21, 22 and 23. One or more of the guide pins are rotated to tilt the dividing back housing with respect to the adaptor plate 12 until a sharp image is produced on all of the peripheral portions of the focal plane of the camera or cut film holder 25.

Once the guide pins 21, 22 and 23 have been adjusted to provide a sharp focus of the image on all portions of the focal plane of the camera back, then the spherical nuts 54 are tightened, and no further adjustment should be necessary, unless the recording apparatus is mounted on a different image tube. When a different photographic recording device is mounted on the dividing back housing 16, or a different thickness of film is used, it may be necessary to change the axial focus by rotating focusing knob 15.

While the present invention has been illustrated and described with reference to certain preferred embodiments only, it will be obvious to those skilled in the art that it is not so limited but is susceptible of various changes and modifications without departing from the spirit and scope thereof.

The embodiments of the invention in which an exclusive property or privilege is claimed are defined as follows:

1. A precision focusing adjustment for photographic recording apparatus comprising:
   (A) a focusing adjustment housing adapted to be mounted on a device for displaying an image on an image plane and having an axis substantially perpendicular to the image plane;
   (B) a threaded focusing knob rotatably mounted in said housing;
   (C) a threaded focusing nut engaging said focusing knob for movement in an axial direction toward and away from the image plane in response to rotation of said focusing knob;
   (D) a plurality of guide pin bushings mounted in said housing and extending substantially parallel to said axis;
   (E) a plurality of guide pins with one guide pin mounted in each bushing;
   (F) a camera back mounting means mounted on the other ends of said guide pins;
   (G) a lens assembly mounted between said focusing adjustment housing and said camera back mounting means;
   (H) said guide pins being individually adjustable to universally tilt said camera back mounting means with respect to said axis and said image plane.

2. A precision focusing adjustment for photographic recording apparatus comprising:
   (A) a focusing adjustment housing adapted to be mounted on a device for displaying an image on an image plane and having an axis substantially perpendicular to the image plane;
   (B) a threaded focusing knob rotatably mounted in said housing;
   (C) a threaded focusing nut engaging said focusing knob for movement in an axial direction toward and away from the image plane in response to rotation of said focusing knob;
   (D) a plurality of guide pin bushings mounted in said housing and extending substantially parallel to said axis;
   (E) a plurality of guide pins with one guide pin mounted in each bushing;
   (F) a camera back mounting means mounted on the other ends of said guide pins;
   (G) a lens assembly mounted between said focusing adjustment housing and said camera back mounting means;
   (H) said guide pins being individually adjustable to tilt said camera back mounting means with respect to said axis and said image plane, and means for clamping said guide pins in adjusted position.

3. A precision focusing adjustment for photographic recording apparatus comprising:
   (A) a focusing adjustment housing adapted to be mounted on a device for displaying an image on an image plane and having an axis substantially perpendicular to the image plane;
   (B) a threaded focusing knob rotatably mounted in said housing;
   (C) a threaded focusing nut engaging said focusing knob for movement in an axial direction toward and away from the image plane in response to rotation of said focusing knob;
   (D) a plurality of guide pin bushings mounted in said housing and extending substantially parallel to said axis;
   (E) a plurality of guide pins with one guide pin mounted in each bushing and threaded into said focusing nut at one end thereof;
   (F) a dividing back housing mounted on the other ends of said guide pins, said guide pins each having a rotatable connection to said dividing back housing forming a ball and socket joint with a limited degree of freedom;
   (G) a lens assembly mounted between said focusing adjusting housing and said dividing back housing;
   (H) said guide pins being individually adjustable and rotatable to tilt said dividing back housing with respect to said axis and said image plane, and means for clamping said guide pins in adjusted position.

4. A precision focusing adjustment for photographic recording apparatus comprising:
   (A) a focusing adjustment housing adapted to be mounted on a device for displaying an image on an image plane and having an axis substantially perpendicular to the image plane;
   (B) a threaded focusing knob rotatably mounted in said housing;
   (C) a threaded focusing nut engaging said focusing knob for movement in an axial direction toward and away from the image plane in response to rotation of said focusing knob;
   (D) a plurality of guide pin bushings mounted in said housing and extending substantially parallel to said axis;
   (E) a plurality of guide pins with one guide pin mounted in each bushing and threaded into said focusing nut at one end thereof;
   (F) a dividing back housing mounted on the other ends of said guide pins, said guide pins each having a rotatable connection to said dividing back housing forming a ball and socket joint with a limited degree of freedom;
   (G) a camera back adapter removably mounted on said dividing back housing;
   (H) a lens assembly mounted between said focusing adjusting housing and said dividing back housing;
   (I) said guide pins being individually adjustable and rotatable to tilt said dividing back housing with respect to said axis and said image plane, and means for clamping said guide pins in adjusted position.

5. A precision focusing adjustment for photographic recording apparatus comprising:
   (A) a focusing adjustment housing adapted to be mounted on a device for displaying an image on an image plane and having an axis substantially perpendicular to the image plane;
   (B) a threaded focusing knob rotatably mounted in said housing;
   (C) a threaded focusing nut engaging said focusing knob for movement in an axial direction toward and away from the image plane in response to rotation of said focusing knob;
   (D) a plurality of guide pin bushings mounted in said housing and extending substantially parallel to said axis;
   (E) a plurality of guide pins with one guide pin mounted in each bushing and threaded into said focusing nut at one end thereof;
(F) a camera back mounting means mounted on the other ends of said guide pins,
said guide pins each having a universal connection to said camera back mounting means,
said guide pins being individually adjustable to tilt the dividing back housing with respect to said axis and said image plane,
means for clamping said universal connection to prevent rotation of said guide pins; and
(G) a lens assembly mounted between said focusing adjusting housing and said dividing back housing.

References Cited by the Examiner
UNITED STATES PATENTS

| | | | |
|---|---|---|---|
| 2,147,434 | 2/1939 | Gallaher | 88—24 |
| 2,257,081 | 9/1941 | Whitman | 95—50 |
| 2,969,008 | 1/1961 | Ferrari | 95—45 X |
| 3,149,903 | 9/1964 | Merrick | 346—110 |

JOHN M. HORAN, *Primary Examiner.*